United States Patent [19]

Origuchi et al.

[11] Patent Number: 5,212,431
[45] Date of Patent: May 18, 1993

[54] ELECTRIC VEHICLE

[75] Inventors: Masato Origuchi; Masato Fukino; Hideaki Horie; Namio Irie, all of Kanagawa, Japan

[73] Assignee: Nissan Motor Co., Ltd., Yokohama, Japan

[21] Appl. No.: 703,514

[22] Filed: May 21, 1991

[30] Foreign Application Priority Data

May 23, 1990 [JP] Japan .................. 2-131167

[51] Int. Cl.$^5$ .......................... B60L 11/02
[52] U.S. Cl. .................... 318/139; 180/65.4
[58] Field of Search ............ 318/139; 180/65.1, 65.2, 180/65.3, 65.4

[56] References Cited

U.S. PATENT DOCUMENTS

| | | | |
|---|---|---|---|
| 3,565,202 | 2/1971 | Evans et al. | 180/65 |
| 3,719,881 | 3/1973 | Shibata et al. | 180/65 X |
| 3,792,327 | 2/1974 | Waldorf | 318/139 |
| 3,837,419 | 9/1974 | Nakamura | 318/139 X |
| 4,187,436 | 2/1980 | Etienne | 180/65 R X |
| 4,199,037 | 4/1980 | White | 180/65 C |
| 4,305,254 | 12/1981 | Kawakatsu et al. | 290/45 X |
| 4,306,156 | 12/1981 | Monaco et al. | 290/17 |
| 4,902,956 | 2/1990 | Sloan | 307/10.7 |
| 4,951,769 | 8/1990 | Kawamura | 180/65.4 |

FOREIGN PATENT DOCUMENTS

| | | |
|---|---|---|
| 0073861 | 3/1983 | European Pat. Off. . |
| 221314 | 9/1924 | United Kingdom . |
| 1339140 | 11/1973 | United Kingdom . |
| 1407951 | 1/1975 | United Kingdom . |
| 1581049 | 10/1980 | United Kingdom . |

OTHER PUBLICATIONS

"Jidousha Kougaku Zensho 8 (Automotive Engineering Encyclopedia vol. 8): Denki Jidousha, Shingata Gendouki (Electric Vehicle, New Prime MOver)"; translation of pp. 11 to 13 attached.

Primary Examiner—Bentsu Ro
Attorney, Agent, or Firm—Pennie & Edmonds

[57] ABSTRACT

An electric vehicle driven by a motor is provided with a secondary battery and a generator which are controlled by a controller so that when an amount of charge of the secondary battery becomes lower than a predetermined value the generator is put from a stopping state into an operating state and so that when the amount of charge of the secondary battery becomes higher than another predetermined value the generator is put from the operating state into the stopping state. The controller changes the predetermined values in accordance with the changing rate of the electric energy consumption of the secondary battery so that the secondary battery loses it amount of charge after the generator becomes empty of its fuel. The electric vehicle can fully perform its characteristic and the generator is effectively operated by storing excessive electric energy of the generator and effectively using the secondary battery.

8 Claims, 4 Drawing Sheets

ELECTRIC VEHICLE

BACKGROUND OF THE INVENTION

1. Field of the Invention

The present invention relates to an electric vehicle which is driven by a motor, and more particularly, to an electric vehicle provided with a secondary battery and a generator as an energy source.

2. Description of the Prior Art

An electric vehicle is preferably used in view of air pollution, noise level and diversification of energy consumption. Such an electric vehicle is generally provided with a motor, a controller, and a battery which are used instead of an engine, a transmission, and a fuel tank in the internal combustion engine. Typical batteries for electric vehicles include a secondary battery and fuel cells, which are chemical batteries. The secondary battery is rechargeable by means that direct current energy is applied to the cells reversely as compared with the discharging condition. A fuel cell is normally operated by continuously receiving fuel gas therein and directly transforms the chemical energy of fuel gas into electric energy. Various types of fuel cells have been proposed and practically used, which include, for example, hydrogen-oxygen fuel cells, carbonate hydrogen fuel cells, hydrazine fuel cells, ammonia fuel cells, and methanol fuel cells.

Hitherto a direct-current generator was popularly used as a generator for the electric vehicle. Since the technology of the power electronics has been remarkably improved, thyristor motors and induction motors have become used as motors of an electric vehicle. Furthermore, such motors are controlled by various control methods such as a voltage changing control, a resistance control, a thyristor chopper control, a transistor chopper control, and an inverter control.

One typical electric vehicle is disclosed in FIG. 6. The electric vehicle is provided with a secondary battery 1 and a fuel cell power system 2 as an energy source. The secondary battery 1 is disposed in a lower and center portion of the vehicle so as to be rechargeable from the fuel cell power system 2 and to be dischargeable to a motor (not shown). The fuel cell power system 2 includes a stack 3 which is formed by laminating a plurality of cell units. The stack 3 receives fuel which is sent to it from a fuel reforming device 4 having a burner (not shown), and air which is heated by a heat exchanger 5 and is supplied from an air supply unit 6. The reformed fuel and the heated air chemically react in the stack 3 so that chemical energy is transformed into electric energy.

In the stack 3, it is necessary to remove the heat incurred by the reaction bared electric generation and to keep the temperature of the cells at a suitable level in order to prevent parts of the stack 3 from degrading their quality, and to equalize a reaction speed of electric generation. Therefore, a circulating pump 7 circulates a coolant to the stack 3 so that the stack 3 is kept at an optimum temperature. A chopper 9 controls an applied voltage which is supplied from the stack 3 to the motor by means that the chopper 9 speedily connects from disconnects the stack 3 and the electric source through a thyristor or transistor (not shown). With this rapid chopping operation, a current-carrying ratio (an ON-OFF period ratio per hour) is varied. Therefore, an average applying voltage is continuously varied from zero volts to the maximum value of the battery. An air conditioner 10 is disposed at a roof portion in the electric vehicle in order to control the temperature and the humidity of the passenger room.

However, the fuel cell power system 2 is continuously operated under a running condition of the electric vehicle. Accordingly, the electric vehicle normally occurs noise and exhaust gases such as $CO_2$ under a running condition. Furthermore, since the secondary battery 1 supplies electric energy to the motor under an uphill road running or acceleration condition while the fuel cell power system 2 always produces a predetermined electric energy and supplies it to the motor, the electric vehicle encounters the difficulty that the secondary battery 1 loses its discharging ability before the fuel cell power system 2 becomes empty of fuel. This causes the problem that the electric vehicle cannot have essential vehicular performance under an uphill running or acceleration condition.

SUMMARY OF THE INVENTION

It is an object of the present invention to provide an improved electric vehicle which largely suppresses the release of noises and exhaust gasses under a running condition.

Another object of the present invention is to provide an improved electric vehicle which can perform sufficiently under various conditions.

An electric vehicle according to the present invention comprises a secondary battery and a generator which are connected to a motor which drives a vehicle body to run upon receiving electric energy from at least one of the secondary battery and the generator. The generator selectively shifts between an operating state and a stopping state. The detecting and outputting means detects and outputs an amount of charge in the secondary battery. The control means is operatively connected to the generator and the secondary battery charge amount detecting means. The control means is arranged such that the generator is put from the stopping state into the operating state when the control means judges that the amount of charge in the secondary battery is smaller than a predetermined first value and such that the generator is changed from the operating state into the stopping state when the control means judges that the amount of charge in the secondary battery is larger than a predetermined second value.

With this arrangement, since the generator for the electric vehicle is operated in accordance with the amount of charge in the secondary battery, it becomes possible to shorten the operating period of the generator during a vehicle running condition. Therefore, the generation of noises and exhaust gasses are remarkably suppressed. Furthermore, since the secondary battery is prevented from losing its charge before the generator becomes empty of fuel, the electric vehicle can fully perform under various conditions.

DETAILED DESCRIPTION OF THE INVENTION

Figure 1:
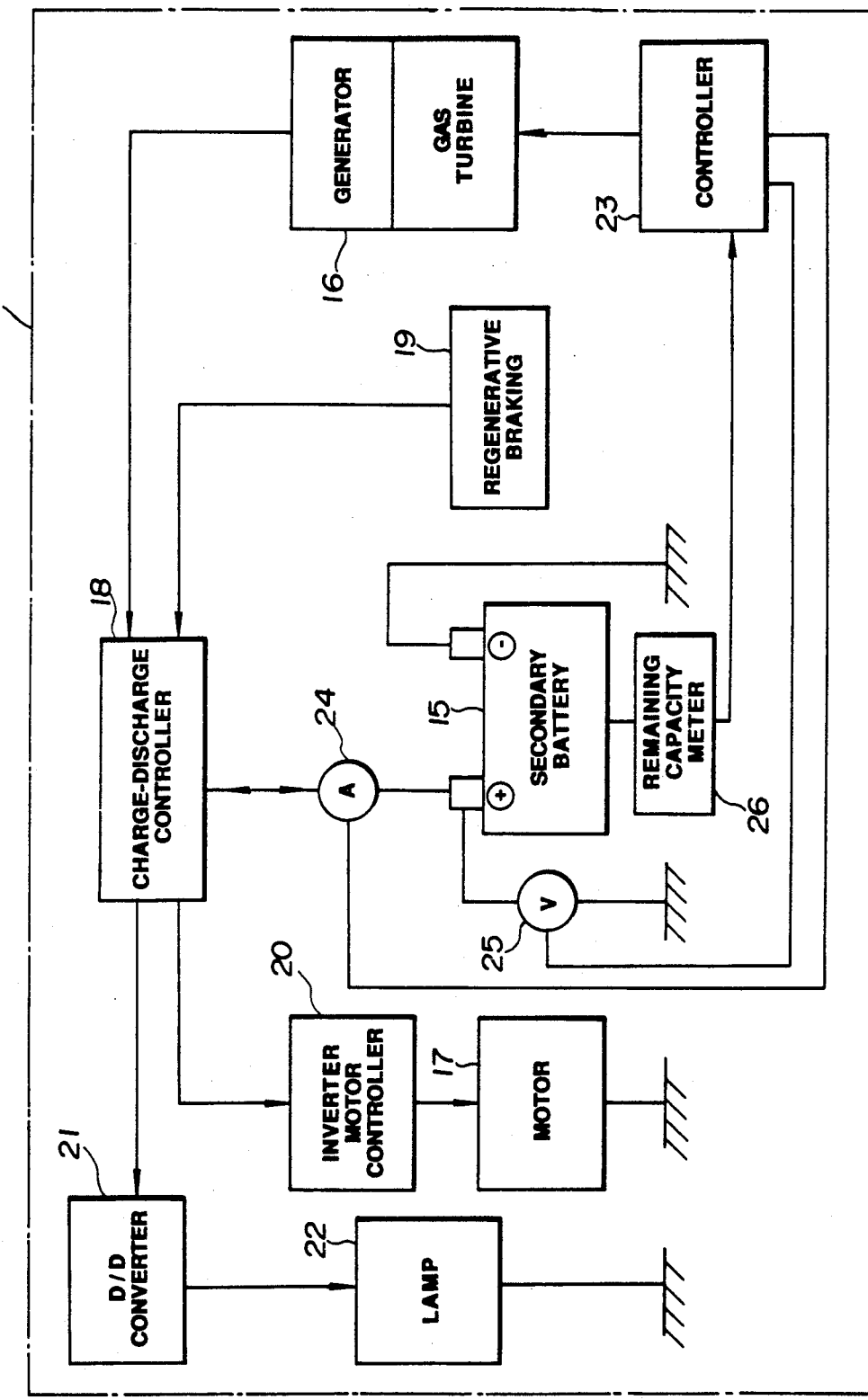
FIG. 1 is a block diagram of an embodiment of an electric vehicle according to the present invention.

Referring now to FIG. 1, an embodiment of an electric vehicle according to the present invention is illustrated by the reference character V. The electric vehicle V comprises a secondary battery 15 which is controllable in the charging and discharging of electric energy and a generator 16 which is time controllable in its operation. The secondary battery 15 and the generator 16 are connected to a charge-discharge controller 18 which controls the charging and discharging of the secondary battery 15. The charge-discharge controller 18 is connected to a motor 17 by which the electric vehicle V is driven.

The secondary battery 15 is mainly charged from the generator 16 while being charged in some degree from a regenerative braking 19 which transforms kinetic energy into electric energy. The secondary battery 15 mainly supplies electric energy to the motor 17 through an inverter motor controller 20 which changes direct current power to alternating-current power. The secondary battery 15 further supplies electric power to various lamps 22 through a D/D converter 21.

The generator 16 of a gas turbine type is controlled by a controller 23 which judges whether the generator 16 should be operated or not in accordance with the condition of the secondary battery 15. An ammeter 24 which measures the size of direct current sent from or to the secondary battery 15 is disposed between the charge-discharge controller 18 and the secondary battery 15. A voltmeter 25 is connected between the secondary battery 15 and the ground to measure the voltage of the secondary battery 15. A remaining capacity meter 26 is connected to the secondary battery 15 to measure the remaining amount of electric energy in the secondary battery 15 (or the amount of charge in the secondary battery 15). The controller 23 is connected to the ammeter 24, the voltmeter 25, and the remaining capacity meter 26 so as to receive detecting signals from the meters 24, 25 and 26. The controller 23 controls the generator 16 on the basis of the detecting signals. The motor 17 of an induction type is controlled by the inverter motor controller 20.

A control method of the above described electric vehicle V will be discussed hereinafter, referring to FIGS. 2 and 3.

Figure 2:
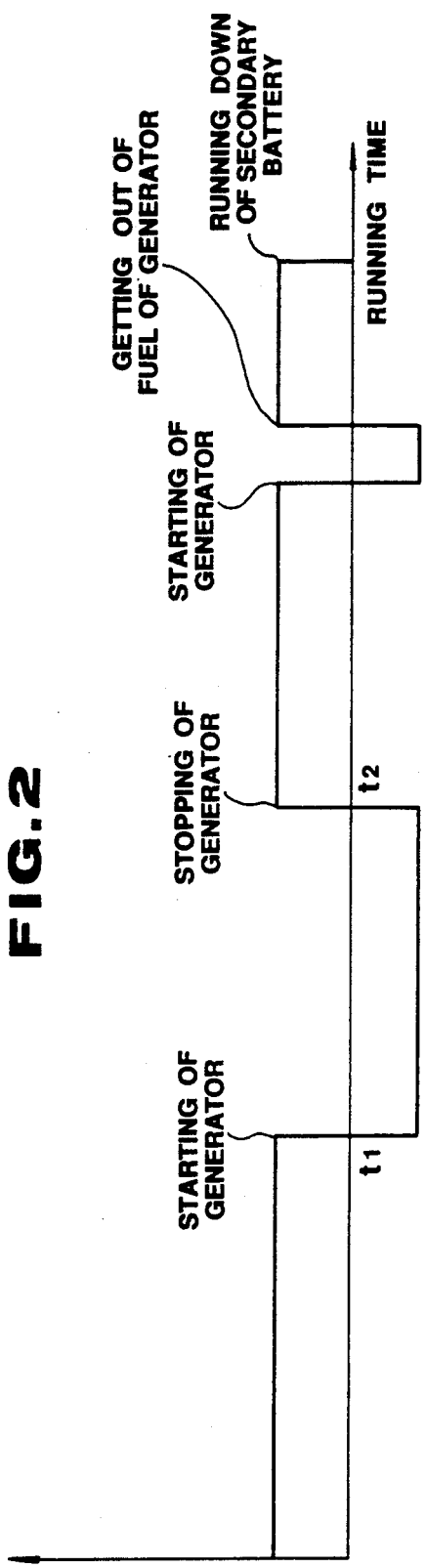
FIGS. 2 and 3 are explanatory views of FIG. 1, in which operation of a secondary battery and a generator are disclosed.
Figure 3:
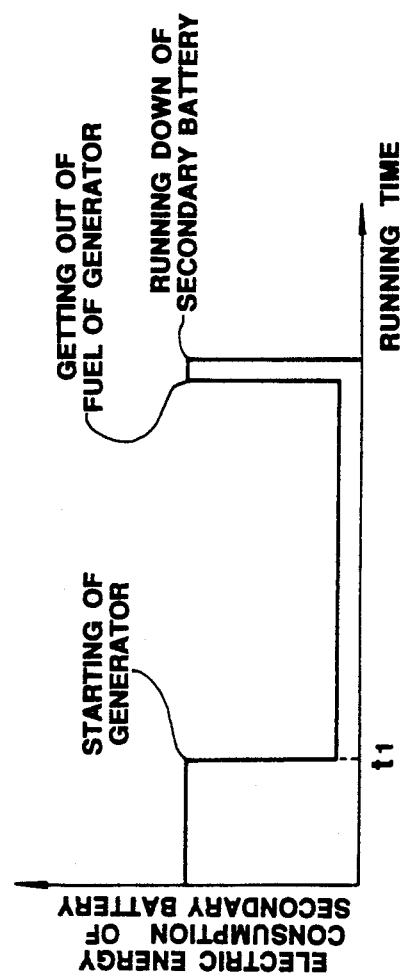

In FIGS. 2 and 3, a lateral axis indicates a running time of the electric vehicle V and a vertical axis indicates the amount of electric energy from the secondary battery 15.

As shown in FIG. 2, the graph starts from the condition that the secondary battery 15 is fully charged and the fuel for the generator 16 is fully equipped in the electric vehicle V. In this case, the electric vehicle V is driven at relatively low and constant speeds and does not use the lamps 22. When the remaining charged of the secondary battery 15 becomes 20% of the full capacity (a condition that the secondary battery 15 has been fully charged) due to the running for a period of time from time 0 to a predetermined time $t_1$, the generator 16 is operated and supplies electric energy to the motor 17 to drive the electric vehicle V. Under this condition, when the generator 16 excessive generates electric energy as compared with the required electric energy for the motor 17, the excessive electric energy is stored in the secondary battery 15 through the change-discharge controller 18. Then, the electric vehicle V keeps on being driven while the generator 16 supplies electric energy to the motor 17 and the secondary battery 15. When the remaining charge of the secondary battery 15 becomes 80% of the full capacity due to the running to a predetermined time $t_2$, the generator 16 is stopped and the secondary battery 15 starts to supply electric energy to the motor 17. The above-mentioned operations are repeated until both the secondary battery 15 and the generator 16 respectively expand their stored energy and fuel.

FIG. 3 shows a control method of the electric vehicle V under the condition that the secondary battery 15 discharges a relatively large amount of electric energy, for example, under conditions of a mountain path running while using the lamps and the air conditioning. Under these conditions, the secondary battery 15 keeps on discharging electric energy while the generator 16 is operated. Accordingly, if the electric vehicle V is driven under the low speed running condition as in FIG. 2, the secondary battery 15 loses its capacity (an amount of dischargeable electric energy) at an early time since the starting of the generator 16 in the electric vehicle V is too late under the above-mentioned condition. In order to obviate the drawback of the control method, the controller 23 calculates a total consumption of electric energy from a predetermined time to a present time on the basis of the signals from the ammeter 24, the voltmeter 25, and the remaining capacity meter 26 and further judges when the secondary battery 15 completely loses its capacity. On the basis of these judgements, the controller 23 decides when the generator 16 is to be operated. For example, the controller 23 was previously programmed to start operation of the generator 16 when the remaining charge of the secondary battery 15 becomes 50% of full capacity. When the generator 16 is operated, the electric vehicle V is mainly driven by the energy from the generator 16 while a shortage of the energy is supplied from the secondary battery 15. Under this condition, since the stared charged of the secondary battery 15 cannot become 80% of the full capacity, the generator 16 keeps on operating until its fuel is depleted. Similarly, the secondary battery 15 keeps on discharging until becomes empty.

With the thus arranged electric vehicle V, it becomes possible to shorten the operating period of the generator 16. Therefore, exhaust gas and noises are remarkably suppressed thereby preventing the electric vehicle V from losing its merits.

Since the operation starting time of the generator 16 is controlled according to the remaining capacity of the secondary battery 15, the remaining capacity of the secondary battery 15 is prevented from becoming empty before the generator 16 uses out its fuel. Therefore, the electric vehicle V can fully perform its characteristics until the fuel supply of the generator 16 becomes empty.

In this electric vehicle V, the generator 16 is controlled so as to start at the time that the stored charged of the secondary battery 15 becomes 20% and to stop at the time becomes 80% of its full capacity. This lessens the degradation in the generating efficiency due to the repeated starting and stopping of the discharge of the secondary battery 15 and to the frequent use of electric energy in switching modes.

Figure 4:
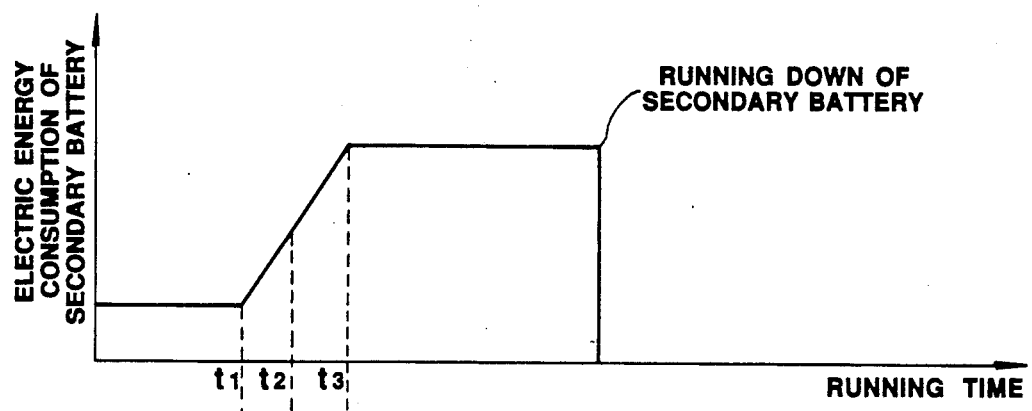
FIGS. 4 and 5 are explanatory views of another embodiment of the control system of the electric vehicle.

Referring to FIG. 4, a second embodiment of a electric vehicle according to the present invention will be discussed hereinafter.

In the second embodiment of the present invention, the electric energy consumption of the secondary battery 15 is continuously calculated at least twice. With the sum of at least two calculations and the derivation of the changing rate of the energy consumption by at least two calculations, the time when the secondary battery 15 becomes empty of its capacity is accurately forecasted. Upon this judgement, the controller 23 changes the operation mode of the generator 16 by changing a value of a preset base value to decide the timing to operate the generator 16 and which is in correspondence with the predetermined value of the remaining capacity of the secondary battery 15.

Figure 5:
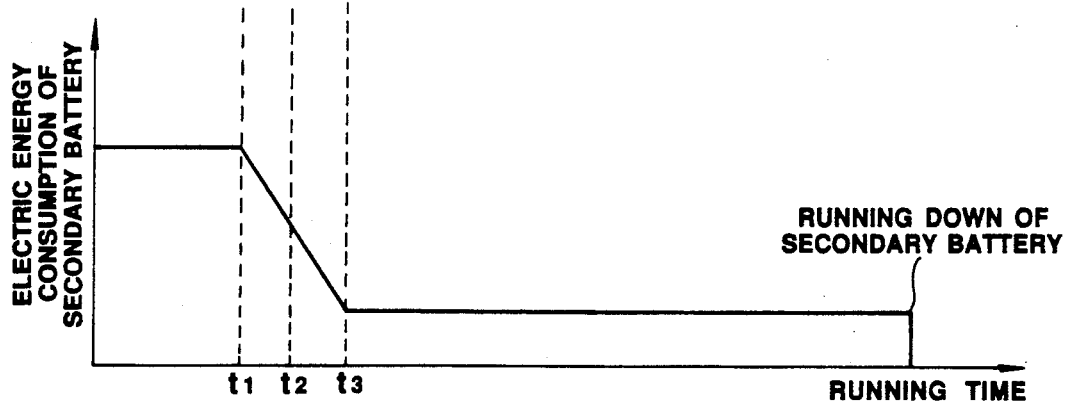
Figure 6:
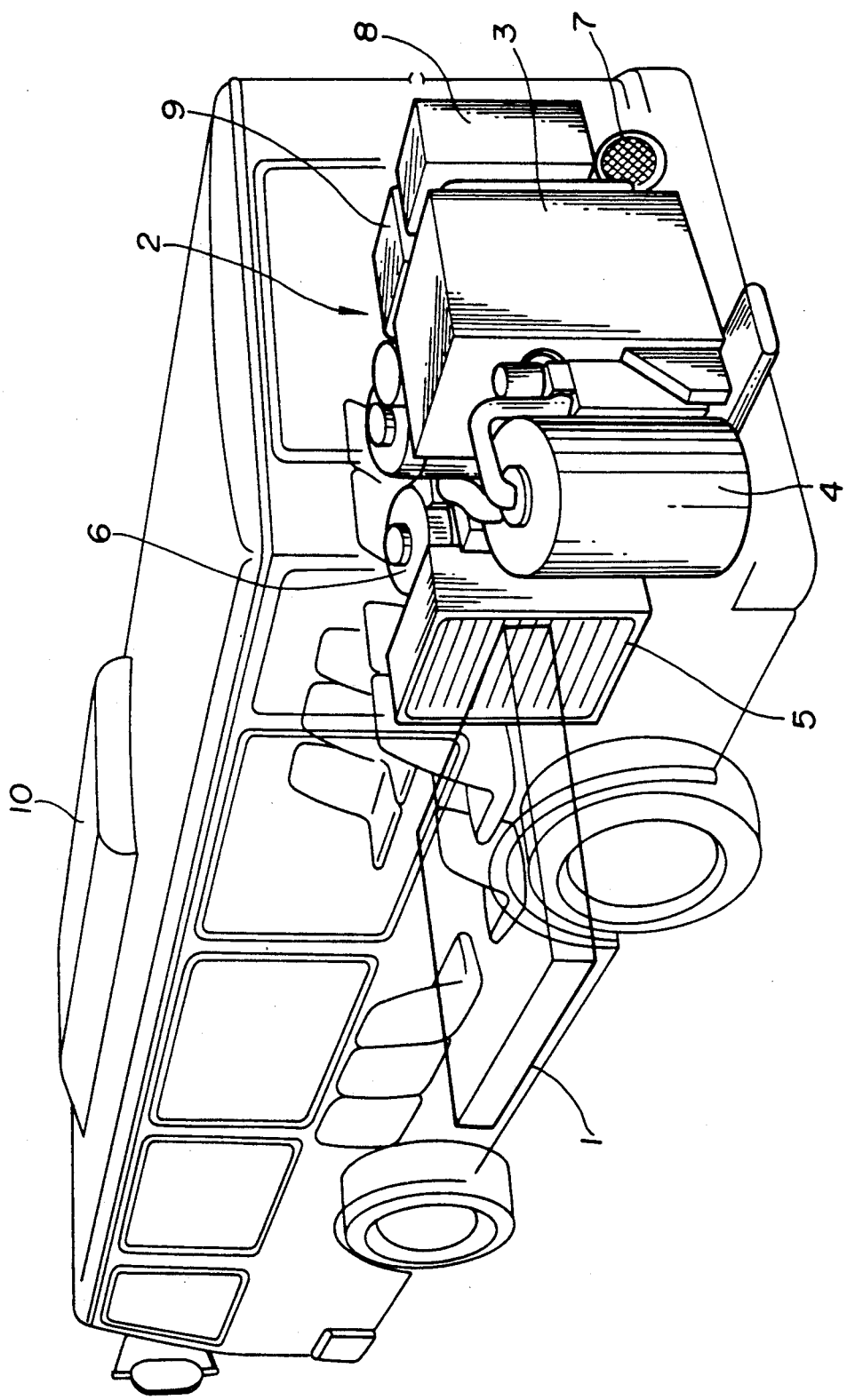
FIG. 6 is a perspective view of a conventional electric vehicle.

In FIG. 4, the controller 23 calculates the total electric energy consumption of the secondary battery 15 from the time $t_1$ to the time $t_2$ and continuously calculates the total electric electric energy consumption from the time $t_2$ to the time $t_3$. Similarly, the calculation of the electric energy consumption of the secondary battery 15 is carried out in the case shown in FIG. 5. Although the total electric energy consumption for a period from the time $t_1$ to the time $t_3$ is the same in the case shown in FIG. 4 and in the case shown in FIG. 5, the cases have different values in the changing rate of the electric energy consumption from the time $t_1$ to the time $t_3$. That is to say, in FIG. 4 the changing rate of the electric energy consumption from the time $t_1$ to the time $t_3$ is increased and in FIG. 5 the changing rate of the electric energy consumption from the time $t_1$ to the time $t_3$ is decreased. Therefore, the electric vehicle V driven in the case shown in FIG. 4 needs to operate the generator 16 at an earlier time as compared with the time in the case shown in FIG. 5.

Accordingly, this control method shown in the second embodiment of the present invention calculates when the secondary battery 15 becomes empty in its capacity although the electric energy consumption of the secondary battery 15 is merely summed up by the control method of the first embodiment. Furthermore, the control method of the second embodiment is valuable in the case that the driving condition of the electric vehicle V is changed, for example, in the case that the electric vehicle V is driven from a highway to a mountain path or from a mountain path to a highway.

Although a generator of a gas turbine type is applied to the generator 16 in these embodiments of the present invention, the generator 16 is not limited to this type, and a fuel cell power system may be used as the generator 16.

Furthermore, although in the above-mentioned embodiments the generator 16 starts to operate when the secondary battery 15 has at most 20% capacity as compared with a full capacity, the generator 16 may be started to operate at an earlier time in the event of an accelerating period of the electric vehicle V. Furthermore, the generator 16 may be operated and stopped when the secondary battery 15 has other predetermined values in its capacity.

What is claimed is:

1. An electric vehicle comprising:

a secondary battery;

a generator selectively set in an operating state and a stopping state;

a motor electrically connected to said secondary battery and said generator, said motor driving a vehicle body to run upon receiving electric energy from at least one of said secondary battery and said generator;

means for detecting an amount of charge in said secondary battery and for outputting a charge signal indicative of the detected amount of charge in said secondary battery; and means for controlling said generator and said secondary battery according to the signal from said detecting means, said controlling means setting said generator in the operating state when the detected amount of charge of said secondary battery is smaller than a first predetermined value which value is changed according to the total amount of energy consumption in said secondary battery.

2. An electric vehicle comprising:

a secondary battery;

a generator selectively set in an operating state and a stopping state;

a motor electrically connected to said secondary battery and said generator, said motor driving a vehicle body to run upon receiving electric energy from at least one of said secondary battery and said generator;

means for detecting an amount of charge in said secondary battery and for outputting a charge signal indicative of the detected amount of charge in said secondary battery;

means for calculating the rate of energy consumption of said motor and for outputting a signal indicative of the measured rate of the energy consumption of said motor; and means for controlling said generator and said secondary battery according to the signals from said detecting means and said calculating means, said controlling means setting said generator in the operating state when the detected amount of charge is smaller than a first predetermined value and setting said generator in the operating state when the calculated rate of the energy consumption is larger than a second predetermined value.

3. An electric vehicle as claimed in claim 2, wherein the first predetermined value is changed according to the total energy consumption calculated by said calculating means.

4. An electric vehicle comprising:

a secondary battery;

a generator selectively set in an operating state and a stopping state;

a motor for driving a vehicle body to run upon receiving electric energy from at least one of said secondary battery and said generator; and control means for controlling said generator to selectively take the operating state and the stopping state in accordance with the amount of charge in said secondary battery, said control means including a means for determining the rate of energy consumption for each predetermined time period of said motor, and accordingly switching said generator into the operating state when the amount of charge in said secondary battery is smaller than a predetermined value and the determined rate of consumed electric energy for each predetermined time period is larger than that of a predetermined energy consumption for each predetermined time period.

5. An electric vehicle according to claim 4 further comprising:

a means for detecting amount of charge in said secondary battery and outputting a charge signal indicating said detected amount;

wherein said control means calculates the rate of electric energy transfer from said secondary battery, said control means further selects one from among at least two predetermined values in accordance with the calculated rate of electric energy transfer and controls said generator to be in an operating state when said charge signal is smaller than the selected one predetermined value.

6. An electrical vehicle according to claim 5, wherein said control means includes means for determining a total amount of electrical energy stored within said secondary battery and changes said predetermined value on the basis of the determined total electrical energy that said secondary battery has discharged.

7. An electric vehicle as claimed in claim 5, wherein said control means continuously calculates the total of the electric energy discharged by said secondary battery, calculates a change in the rate of electric energy discharge from said secondary battery, and based on the calculated total electrical energy discharge and the calculated change in the rate of electrical discharge, said control means predicts a time when said secondary battery will completely lose its dischargeable electric energy, and in accordance with said predicted time, establishes a time at which said generator will be put into an operating state.

8. An electric vehicle comprising:
a secondary battery;
a generator selectively taking an operating state and a stopping state;
a motor electrically connected to said secondary battery and said generator, said motor driving a vehicle body to run upon receiving electric energy from at least one of said secondary battery and said generator;
means for detecting an amount of charge in said secondary battery for outputting a charge signal indicative of the detected amount of charge in said secondary battery; and
control means operatively connected to said generator and said detecting means, for changing said generator from the stopping state into the operating state when said charge signal is smaller than a predetermined first value and for changing said generator from the operating state into the stopping state when said charge signal is larger than a predetermined second value said control means continuously calculating the total amount of the electric energy transferred from said secondary battery, and a change of rate of electric energy transfer of said secondary battery, in accordance with the calculated total electrical energy transfer and the calculated change in the rate of electrical energy transfer, said control means predicts a time when said secondary battery will completely lose its dischargeable electric energy, and in accordance with said predicted time establishing a time when said generator will be put into an operating state.

* * * * *